(12) United States Patent
Wakeman

(10) Patent No.: US 9,032,805 B2
(45) Date of Patent: May 19, 2015

(54) HIGH PRESSURE VISUAL INDICATOR

(75) Inventor: Russell J. Wakeman, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 372 days.

(21) Appl. No.: 13/472,007

(22) Filed: May 15, 2012

(65) Prior Publication Data
US 2013/0305832 A1    Nov. 21, 2013

(51) Int. Cl.
*G01L 7/16* (2006.01)
*G01F 15/00* (2006.01)
*G01L 19/10* (2006.01)

(52) U.S. Cl.
CPC ...................... *G01L 19/10* (2013.01)

(58) Field of Classification Search
None
See application file for complete search history.

(56) References Cited

U.S. PATENT DOCUMENTS

| | | | | |
|---|---|---|---|---|
| 3,260,118 A * | 7/1966 | Douslin | ........................ | 73/744 |
| 3,393,612 A * | 7/1968 | Gorgens et al. | ................. | 92/101 |
| 3,812,816 A * | 5/1974 | Juhasz | ........................ | 116/220 |
| 3,987,699 A * | 10/1976 | Popenoe | ........................ | 411/13 |
| 4,136,603 A * | 1/1979 | Doyle, Jr. | ....................... | 92/98 R |
| 4,606,391 A * | 8/1986 | Achterholt | ..................... | 152/431 |
| 4,904,132 A * | 2/1990 | Popenoe | ........................ | 411/13 |
| 5,014,786 A | 5/1991 | Kobayashi | | |
| 5,027,740 A * | 7/1991 | Kramer et al. | .............. | 116/34 R |
| 5,189,979 A | 3/1993 | Popenoe | | |
| 5,230,248 A * | 7/1993 | Cucci et al. | ..................... | 73/706 |
| 5,774,048 A * | 6/1998 | Achterholt | ..................... | 340/447 |
| 6,050,145 A * | 4/2000 | Olson et al. | ..................... | 73/706 |
| 6,120,033 A * | 9/2000 | Filippi et al. | ................... | 277/315 |
| 6,224,094 B1* | 5/2001 | Norton | ........................ | 280/735 |
| 6,883,380 B2* | 4/2005 | Romo | .......................... | 73/729.2 |
| 7,958,614 B2* | 6/2011 | Popenoe | ........................ | 29/446 |
| 8,371,175 B2* | 2/2013 | Romo | ............................. | 73/756 |
| 8,429,980 B2* | 4/2013 | Feldmeier | ...................... | 73/756 |
| 8,511,155 B2* | 8/2013 | Patient et al. | ................... | 73/146 |
| 2004/0226383 A1* | 11/2004 | Romo | .......................... | 73/729.2 |
| 2005/0252299 A1* | 11/2005 | Oda | ................................ | 73/715 |
| 2009/0272260 A1* | 11/2009 | Moreno et al. | ................. | 92/168 |
| 2011/0079086 A1* | 4/2011 | Romo | ............................. | 73/756 |
| 2013/0098161 A1* | 4/2013 | Lee | ............................... | 73/744 |

FOREIGN PATENT DOCUMENTS

GB    1143153 A  *  2/1969

\* cited by examiner

*Primary Examiner* — Harshad R Patel
(74) *Attorney, Agent, or Firm* — Ralph E Smith

(57) ABSTRACT

A fluid-pressure indicator includes a housing having a first region and a second region. A pressure-responsive member is disposed in the first region and is movable between an expanded state and a compressed state. An indicator disk is viewable through the pressure-responsive member when the pressure-responsive member is in the compressed state and is obscured from view through the pressure-responsive member when the pressure-responsive member is in the expanded state. A diaphragm is movable from a relaxed state to a deflected state in response to pressure within the second region exceeding a threshold pressure and prevents fluid communication between the first region and the second region. The diaphragm additionally causes the pressure-responsive member to move from the expanded state to the compressed state when the pressure exceeds the threshold pressure.

19 Claims, 4 Drawing Sheets

HIGH PRESSURE VISUAL INDICATOR

FIELD

The present disclosure relates fluid-pressure indicators and more particularly to a fluid-pressure indicator for a high-pressure system.

BACKGROUND

Fluid-pressure indicators may be employed in a system to provide an indication as to the fluid pressure of the system. Generally speaking, fluid-pressure indicators can provide a visual indication as to the exact fluid pressure within a system or, alternatively, can provide an indication as to whether the fluid pressure within the system is above or below a threshold pressure.

Fluid-pressure indicators that provide a reading of an exact fluid pressure within a system may be employed in boilers, compressors, and air-supply lines, for example, where delivery of a fluid at a predetermined pressure is required for system performance. Fluid-pressure indicators that provide an indication as to whether fluid pressure is above or below a threshold pressure may be incorporated in a closed-loop system such as a refrigeration system or a hydraulic system for use in determining whether system pressure is at a safe level for repair and/or maintenance.

One such hydraulic system that may incorporate a fluid-pressure indicator is a hydraulic hybrid vehicle system that employs hydraulic pumps driven by vehicle inertia under braking to store kinetic energy as hydraulic pressure. Such hydraulic hybrid vehicle systems typically include an accumulator that stores hydraulic fluid at relatively high pressures (approximately 7,000 psi) that may be used to drive components of the vehicle during use. While generating and utilizing high-pressure hydraulic fluid in a vehicle increases the overall efficiency of the vehicle, such high-pressure hydraulic fluid must first be reduced to a lower pressure (i.e., approximately 100-200 psi) before a technician can perform maintenance on the hydraulic system and related vehicle components.

Conventional fluid-pressure indicators are not suitable for use with a high-pressure, closed-loop system such as the hydraulic hybrid vehicle system described above, as conventional fluid-pressure indicators are susceptible to damage at high-pressure. For example, U.S. Pat. No. 5,189,979 (the '979 patent) discloses a fluid-pressure indicator including a housing (11) having a diaphragm (16), an indicator disk (20), and a sealed envelope of transparent flexible film (26) enclosing an optically dense indicator fluid (27). The diaphragm (16) is exposed to the fluid pressure of a system in which the housing (11) is installed and exerts a force on the indicator disk (20) to compress the sealed envelope (26) and displace the optically dense indicator fluid (27) when the fluid pressure within the system exceeds a predetermined amount.

While the device of the '979 patent adequately determines and displays whether a pressure of a closed-loop system is above or below a threshold pressure, the diaphragm (16) is not sealed relative to the housing (11) and, therefore, should the diaphragm (16) be exposed to high-pressure fluid, the high-pressure fluid would damage the diaphragm (16), indicator disk (20) and/or sealed envelope (26). Namely, the high-pressure fluid would be permitted to flow around the diaphragm (16) and, further, would be permitted to continually apply a force on the indicator disk (20)—directly and via the diaphragm (16)—up and until damage of the various components.

Therefore, further improvement in the art is desirable.

SUMMARY

A fluid-pressure indicator is provided and may include a housing having a first region and a second region. A pressure-responsive member may be disposed in the first region and may be movable between an expanded state and a compressed state. An indicator disk may be viewable through the pressure-responsive member when the pressure-responsive member is in the compressed state and may be obscured from view through the pressure-responsive member when the pressure-responsive member is in the expanded state. A diaphragm may be movable from a relaxed state to a deflected state in response to pressure within the second region exceeding a threshold pressure and may prevent fluid communication between the first region and the second region. The diaphragm may additionally cause the pressure-responsive member to move from the expanded state to the compressed state when the pressure exceeds the threshold pressure.

A fluid-pressure indicator is provided and may include a housing having a first region, a second region, and a passageway extending between the first region and the second region. A pressure-responsive member may be disposed in the first region and may be movable between an expanded state and a compressed state. An indicator disk may be viewable through the pressure-responsive member when the pressure-responsive member is in the compressed state and may be obscured from view through the pressure-responsive member when the pressure-responsive member is in the expanded state. A diaphragm may be movable from a relaxed state to a deflected state in response to pressure within the second region exceeding a threshold pressure to cause the pressure-responsive member to move from the expanded state to the compressed state. The diaphragm may further contact the housing at an opening of the passageway in the deflected state to prevent fluid communication between the first region and the second region.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
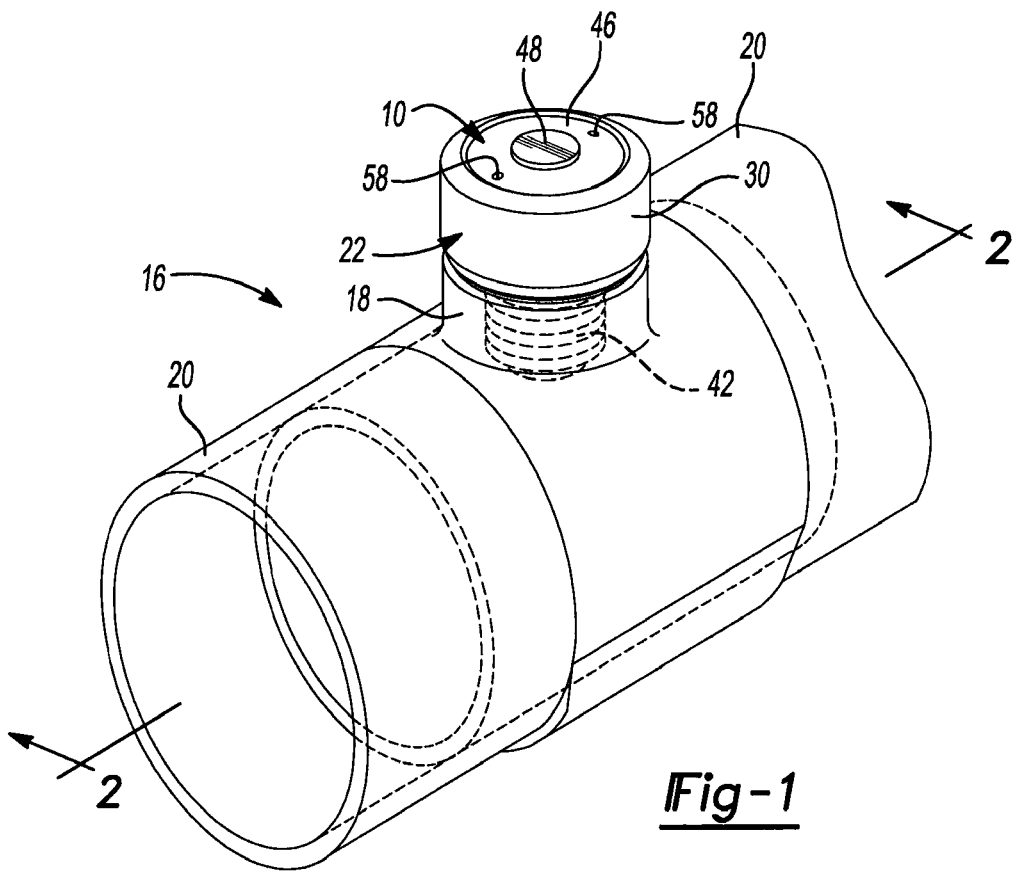
FIG. 1 is a perspective view of a fluid-pressure indicator in accordance with the principles of the present disclosure incorporated into a closed-loop system.

With reference to the figures, a fluid-pressure indicator 10 is provided and may include a sensor assembly 12 and an actuator assembly 14. The sensor assembly 12 and the actuator assembly 14 may cooperate to provide an indication as to whether a fluid pressure within a system is at or above a threshold pressure or, alternatively, whether the fluid pressure of the system is below the threshold pressure. In one configuration, the fluid-pressure indicator 10 may be installed in a closed-loop system 16 (FIGS. 1 and 2) such as, for example, a hydraulic hybrid vehicle system. Namely, the fluid-pressure indicator 10 may be received within a fitting 18 of the closed-loop system 16 and may be fluidly coupled to the system 16 via hydraulic lines 20. The fluid-pressure indicator 10 may provide a visual indication as to whether the fluid pressure within the closed-loop system 16 is at or above the threshold pressure or, alternatively, whether the fluid pressure is below the threshold pressure by detecting the fluid pressure within the fitting 18.

The fluid-pressure indicator 10 may include a housing 22 having a first region 24, a second region 26, and a passageway 28 extending between and in fluid communication with the first region 24 and the second region 26. The first region 24 may be formed by a cylindrical wall 30 of the housing 22 that extends generally from the housing 22 in a direction away from the second region 26. The cylindrical wall 30 may include a series of threads 32 extending into the first region 24 and may terminate at a stop 34.

The second region 26 may be formed on an opposite end of the housing 22 than the first region 24 and may include a substantially cylindrical shape. The second region 26 may additionally include a cylindrical channel 36 and an engagement surface 38. The passageway 28 may extend along a longitudinal axis 40 of the housing and may be in fluid communication with the first region 24 and the second region 26.

Figure 2:
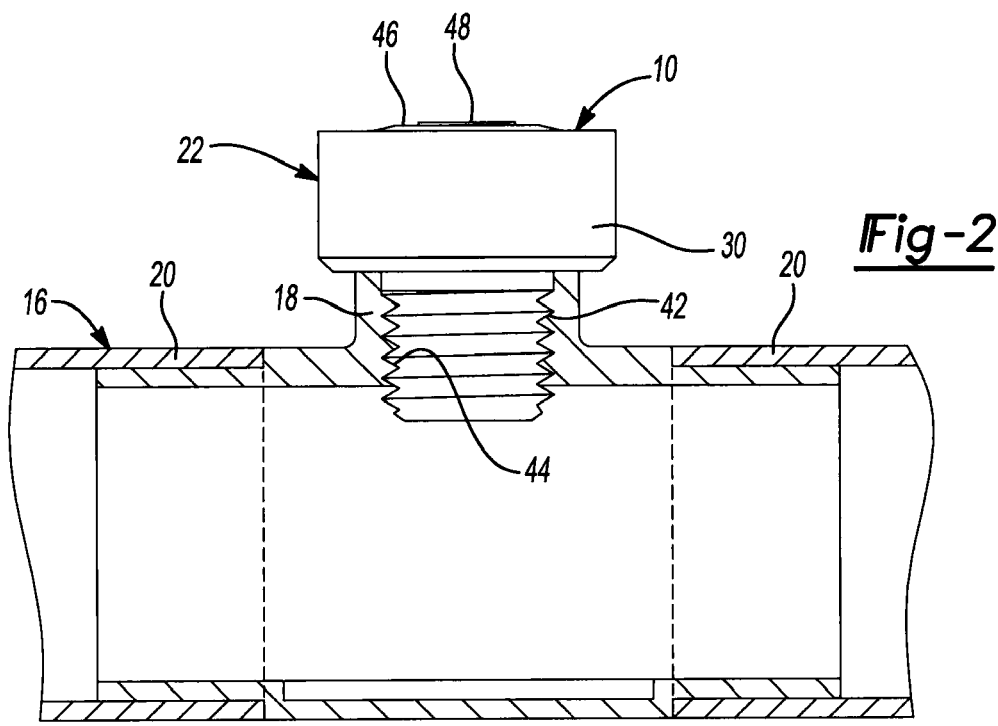
FIG. 2 is a cross-sectional view of the fluid-pressure indicator and closed-loop system of FIG. 1 taken along line 2-2.

As described above, the fluid-pressure indicator 10 may be incorporated into a closed-loop system 16 such that the fluid-pressure indicator 10 is received by a fitting 18 of the closed-loop system 16. In one configuration, the fluid-pressure indicator 10 may be attached to the fitting 18 by threadably engaging the housing 22 with the fitting 18. As such, the housing 22 may include a series of external threads 42 that matingly engage threads 44 of the fitting 18 (FIG. 2). A rotational force may be applied to the housing 22 generally at the wall 30 to rotate the housing 22 such that the threads 42 of the housing 22 engage the threads 44 of the fitting 18. The force applied to the wall 30 may be continually applied until the stop 34 of the housing 22 contacts the fitting 18, thereby preventing further rotation of the housing 22 relative to the fitting 18. The threads 42, 44 may be pipe threads to seal the joint between the housing 22 and the fitting 18. Additionally or alternatively, a seal such as a crush washer or an O-ring (neither shown) could be disposed between the housing 22 and the fitting 18 proximate to the stop 34, for example, to seal the joint between the housing 22 and the fitting 18.

Figure 3:
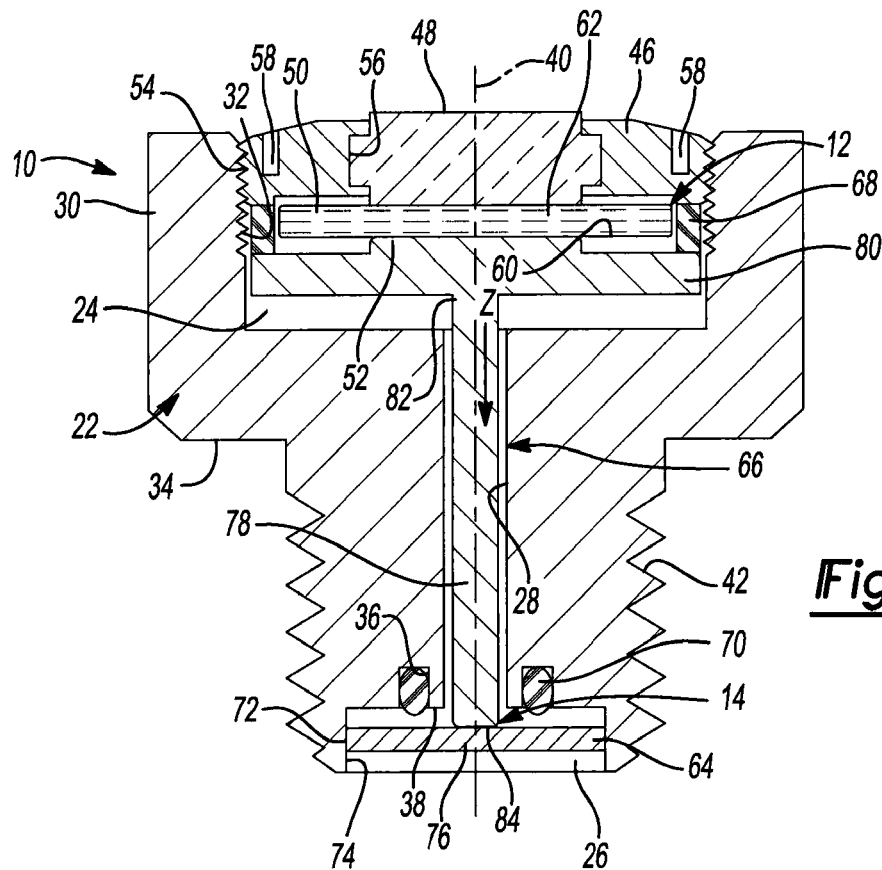
FIG. 3 is a cross-sectional view of the fluid-pressure indicator of FIG. 1 shown in a first state when a diaphragm of the fluid-pressure indicator is exposed to a pressure below a threshold pressure.
Figure 5:
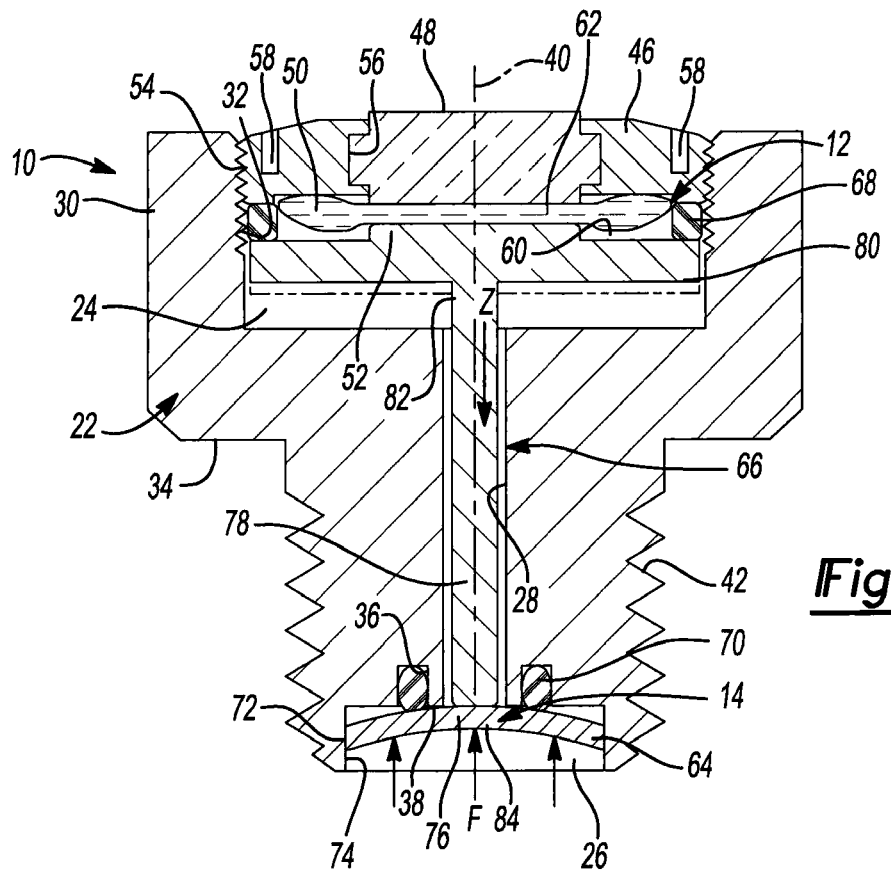
FIG. 5 is a cross-sectional view of the fluid-pressure indicator of FIG. 1 in a second state when a diaphragm of the fluid-pressure indicator is exposed to a pressure at or above a threshold pressure.
Figure 7:
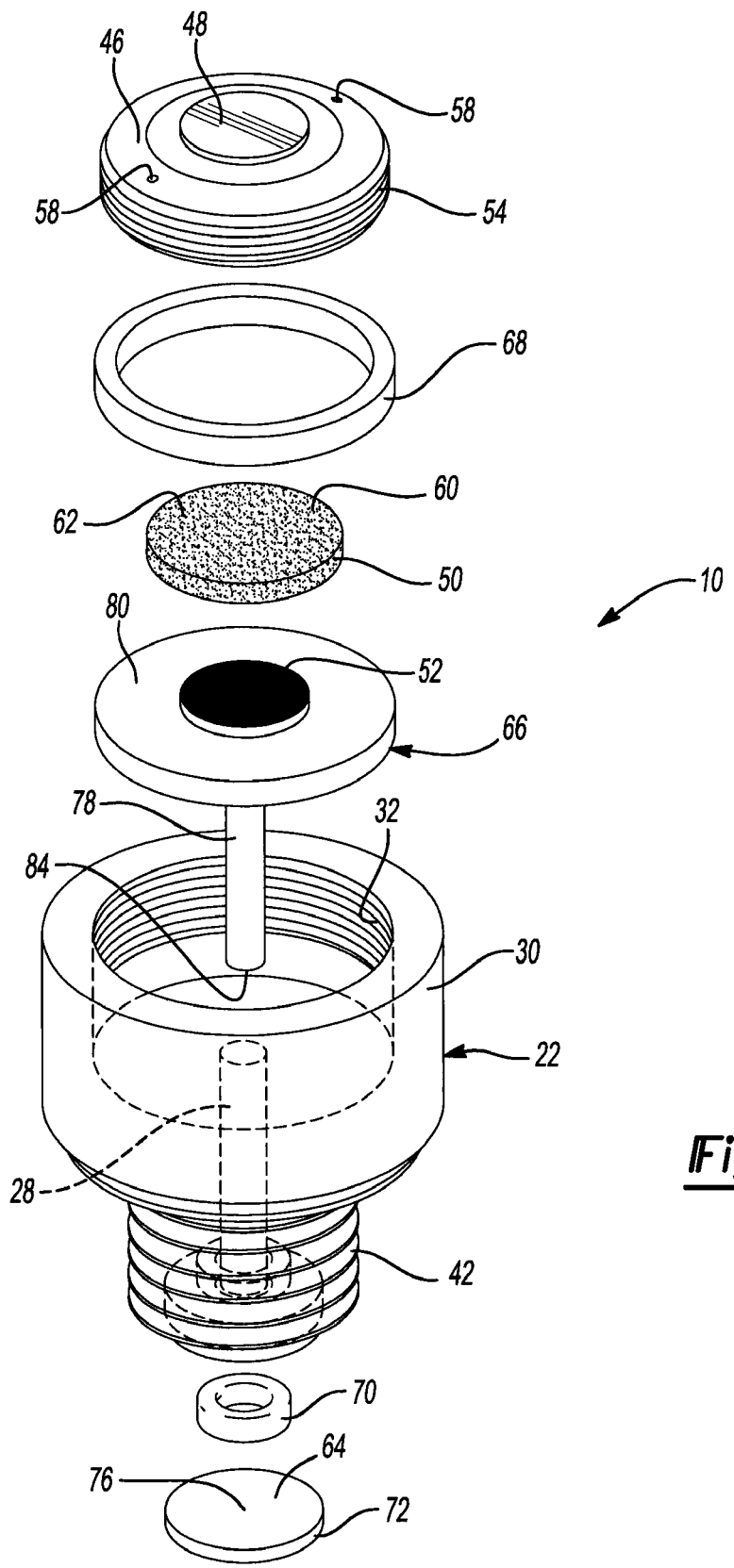
FIG. 7 is an exploded view of the fluid-pressure indicator of FIG. 1.

With particular reference to FIGS. 3, 5, and 7, the sensor assembly 12 is shown as being disposed within the first region 24 of the housing 22 and may include a mounting ring 46, a sight glass 48, an indicator bladder 50, and an indicator disk 52. The mounting ring 46 may include a series of external threads 54, a substantially cylindrical pocket 56, and a pair of diametrically opposed keys 58. The sight glass 48 may be formed from any suitable transparent material such as, for example, glass or plastic, and may be received within the pocket 56 of the mounting ring 46. The sight glass 48 may be retained within the mounting ring 46 by a suitable adhesive and/or may be molded in place when the mounting ring 46 is formed.

The indicator bladder 50 may be positioned adjacent to the mounting ring 46 and sight glass 48 and may be formed from a pair of flexible, transparent sheets that are welded or otherwise attached to one another to create a sealed pocket 60. While the indicator bladder 50 is described as being formed from a pair of flexible, transparent plastic sheets, the indicator bladder 50 could alternatively have a unitary construction and may be formed from any suitable flexible material that allows the indicator bladder 50 to have a flexible outer structure defining the sealed, inner pocket 60.

Regardless of the particular construction of the indicator bladder 50, the pocket 60 may receive an optically dense indicator fluid 62. The indicator fluid 62 may be received within the pocket 60 and may substantially fill the pocket 60, as shown in FIGS. 3 and 5.

The indicator disk 52 may be positioned adjacent to a middle portion of the indicator bladder 50 and may be in an abutting relationship with the indicator bladder 50. The indicator disk 52 may be formed from any material and may include virtually any color. Further, the indicator disk 52 may include text such as "high pressure" or a warning symbol printed thereon that is visible through the sight glass 48 when the fluid-pressure indicator 10 is exposed to a pressure at or above a threshold pressure and is obscured from view through the sight glass 48 by the indicator fluid 62 when the fluid-pressure indicator 10 is exposed to a pressure below a threshold pressure. As will be described in greater detail below, the indicator disk 52 may be supported relative to the indicator bladder 50 by the actuator assembly 14 to selectively move the indicator disk 52 toward and away from the indicator bladder 50 in a direction along the longitudinal axis 40 of the housing 22.

With continued reference to FIGS. 3, 5, and 7, the actuator assembly 14 may include a flexible diaphragm 64, a transmission element 66, a biasing element 68, and a seal 70. The diaphragm 64 may be received within the second region 26 of the housing 22 and may be formed from a thin, metal material such as, for example, stainless steel. The diaphragm 64 may include a substantially cylindrical shape that is similar—if not identical—to the shape of the second region 26.

In one configuration, an outer perimeter 72 of the diaphragm 64 may be welded to an inner surface 74 of the housing 22 at the second region 26. Namely, a weld may be applied around the entire outer perimeter 72 of the diaphragm 64 via a suitable welding process such as laser welding or electron-beam welding in an effort to attach the outer perimeter 72 of the diaphragm 64 to the inner surface 74 of the housing 22 at the second region 26. Attaching the outer perimeter 72 of the diaphragm 64 to the inner surface 74 of the housing 22 allows the diaphragm 64 to deflect at a center portion 76 of the diaphragm 64 while maintaining constant contact with the inner surface 74. Welding the diaphragm 64 to the housing 22 at the second region 26 additionally seals the passageway 28 and, thus, the first region 24 from a fluid pressure exerted on the diaphragm 64 at the second region 26. Sealing the passageway 28 provides the additional benefit of preventing system fluid (i.e., hydraulic fluid, for example) from entering the first region 24 and passageway 28, which, in turn, prevents particulate carried by the system fluid from entering the first region 24 and passageway 28 and causing damage to components of the sensor assembly 12 and actuator assembly 14.

While the diaphragm 64 is described as being welded to the housing 22 about the outer perimeter 72 of the diaphragm 64, the diaphragm 64 could alternatively be received within a circumferential ring (not shown) formed into the inner surface 74 of the housing 22. If the inner surface 74 includes such a circumferential ring, the diaphragm 64 may be press-fit into the cylindrical ring and may additionally be welded once positioned within the circumferential ring.

The transmission element 66 may include a pin portion 78 and a support 80. The pin portion 78 may be fixedly attached to the support 80 at a first end 82 and may be in contact with the diaphragm 64 at a second end 84. The pin portion 78 may include a longitudinal axis that is substantially parallel to the longitudinal axis 40 of the housing 22 to allow the pin portion 78 to extend between the first region 24 and the second region 26. Conversely, the support 80 may include a longitudinal axis that is formed substantially perpendicular to the longitudinal axis 40 of the housing 22 and may be entirely received within the first region 24. Specifically, the support 80 may be slidably received within the first region 24 to permit the support 80 to move within the first region 24 relative to the housing 22 when the pin portion 78 is caused to translate relative to and within the passageway 28. The support 80 may be attached to or may be integrally formed with the indicator disk 52 such that the indicator disk 52 is fixed for movement with the support 80.

The support 80 may bias the pin portion 78 into engagement with the diaphragm 64 due to engagement with the biasing element 68. The biasing element 68 may be a Belleville spring or a wave spring and may be disposed between the mounting ring 46 and the support 80 to allow the biasing element 68 to apply a downward force on the support 80 and, thus, the pin portion 78, to bias the pin portion 78 into the (Z) direction (FIGS. 3 and 5) and into engagement with the diaphragm 64.

The seal 70 may be an O-ring seal and may be received within the channel 36 formed in the second region 26 of the housing 22. The seal 70 may extend from the channel 36 such that the seal 70 is in contact with the diaphragm 64 at all times. Alternatively, the seal 70 may only slightly extend from the channel 36 such that the seal 70 is only in contact with the diaphragm 64 when the diaphragm 64 is moved from a relaxed state (FIG. 3) to a deflected state (FIG. 5).

With continued reference to FIGS. 3 and 5, assembly of the fluid-pressure indicator 10 will be described in detail. The transmission element 66 may be positioned relative to the housing 22 such that the pin portion 78 is slidably received within the passageway 28 and the support 80 is slidably received within the first region 24. The biasing element 68 may be positioned adjacent to the support 80 such that the biasing element 68 is disposed between the support 80 and the mounting ring 46.

The indicator disk 52 may be disposed adjacent to the biasing element 68 and may be received by the support 80. Alternatively, the indicator disk 52 may be integrally formed with the support 80 and therefore may be installed along with the support 80 and pin portion 78. The indicator bladder 50 may be located adjacent to the indicator disk 52 such that the indicator bladder 50 is in contact with the indicator disk 52.

The mounting ring 46 and associated sight glass 48 may be installed into the first region 24 once the indicator bladder 50, indicator disk 52, transmission element 66, and biasing element 68 are installed. Specifically, a tool (not shown) may be received within the keys 58 of the mounting ring 46 to apply a rotational force to the mounting ring 46. Applying a rotational force to the mounting ring 46 causes the external threads 54 of the mounting ring 46 to engage the internal threads 32 of the housing 22, thereby attaching the mounting ring 46 and, thus, the sight glass 48, to the cylindrical wall 30 of the housing 22. Once the mounting ring 46 is installed in the first region 24 of the housing 22, the indicator bladder 50 is essentially sandwiched between the mounting ring 46 and the support 80. Sandwiching the indicator bladder 50 between the mounting ring 46 and the support 80 causes the indicator bladder 50 to be in substantially constant contact with the indicator disk 52 at all times.

The seal 70 may be received within the channel 36 at the second region 26. Once the seal 70 is installed, the diaphragm 64 may then be inserted into the second region 26 and may be retained therein via a weld applied at the outer perimeter 72 of the diaphragm 64. Once the diaphragm 64 is installed in the second region 26 of the housing 22, the biasing element 68 may be slightly compressed between the mounting ring 46 and the support 80 to allow the biasing element 68 to apply a force on the transmission element 66 in the direction (Z) to ensure substantially constant contact between the second end 84 of the pin portion 78 and the diaphragm 64. Once assembled, the fluid-pressure indicator 10 may be installed in a fitting 18 of a closed-loop system 16, for example, by threadably engaging the external threads 42 of the housing 22 with the threads 44 of the fitting 18.

With particular reference to FIGS. 1-5, operation of the fluid-pressure indicator 10 will be described in detail. While the fluid-pressure indicator 10 could be used in virtually any system containing pressurized fluid, the fluid-pressure indicator 10 will be described in conjunction with a closed-loop system 16 incorporating a fitting 18 (FIGS. 1 and 2).

The fluid-pressure indicator 10 is initially installed in the closed-loop system 16 by threadably engaging the external threads 42 of the housing 22 with the threads 44 of the fitting 18. A rotational force may be applied to the housing 22 until the stop 34 of the housing 22 contacts the fitting 18, thereby preventing further rotation of the housing 22 relative to the fitting 18. At this point, the second region 26 of the housing 22 is exposed to an internal cavity of the fitting 18 and, thus, is exposed to the fluid pressure of the closed-loop system 16.

When the fluid pressure of the closed-loop system 16 is below a threshold pressure, the force exerted on the diaphragm 64 by the pressurized fluid within the closed-loop system 16 is insufficient to move the diaphragm 64 from the relaxed state (FIG. 3) to the deflected state (FIG. 5). In one configuration, the threshold pressure may be between 100 psi and 200 psi. Therefore, if the threshold pressure is less than 200 psi, the diaphragm 64 will remain in the relaxed state (FIG. 3).

Once the fluid pressure within the closed-loop system 16 is at or above the threshold pressure of 200 psi, a force (F) is applied to the diaphragm 64 (FIG. 5) to toggle the diaphragm 64 from the relaxed state to the deflected state. Movement of the diaphragm 64 from the relaxed state to the deflected state causes the diaphragm 64 to apply an upward force on the transmission element 66 at the second end 84 of the pin portion 78. The applied force is transmitted to the indicator disk 52 that is fixed for movement with the support 80 of the transmission element 66, thereby causing the indicator disk 52 to compress the indicator bladder 50. Specifically, the indicator bladder 50 is moved from an expanded state (FIG. 3) to a compressed state (FIG. 5) and in so doing, causes the optically dense indicator fluid 62 disposed within the pocket 60 of the indicator bladder 50 to move toward the cylindrical wall 30 of the housing 22. Movement of the indicator fluid 62 toward the wall 30 causes the flexible walls of the indicator bladder 50 to move toward one another and contact one another to allow the indicator disk 52 to be viewed through the sight glass 48.

Figure 6:
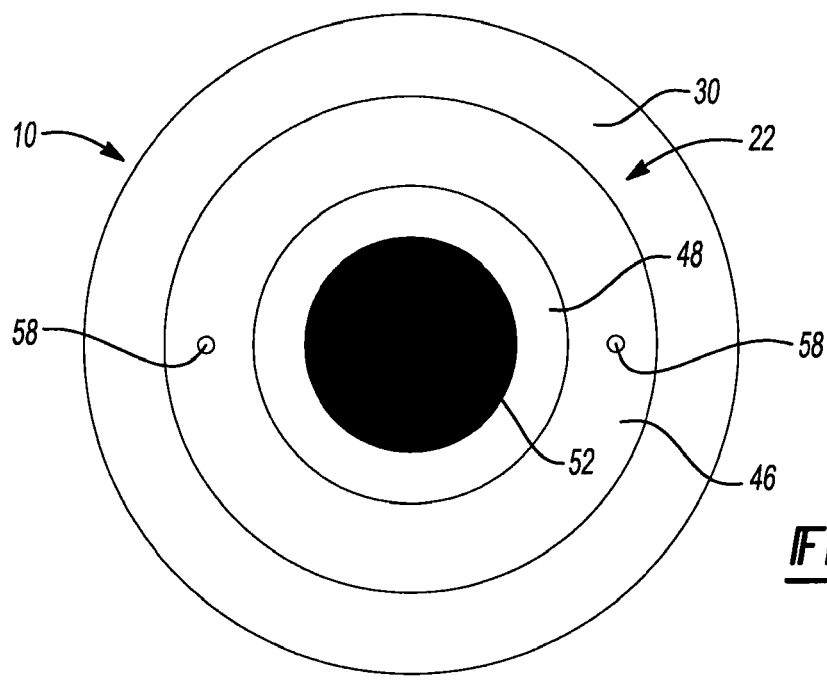
FIG. 6 is a top view of the fluid-pressure indicator of FIG. 5 showing an indicator disk viewable through a sealed envelope of the fluid-pressure indicator.

FIG. 6 provides a top view of the fluid-pressure indicator 10 that illustrates how the indicator disk 52 may be viewed through the indicator bladder 50 and sight glass 48 when the indicator fluid 62 is forced to the edges of the indicator bladder 50 and toward the cylindrical wall 30 of the housing 22. When the indicator disk 52 is viewable through the indicator bladder 50 and sight glass 48, the fluid pressure within the closed-loop system 16 is at or above the threshold pressure.

When the diaphragm 64 is in the deflected state, the force (F) exerted on the diaphragm 64 may cause the center portion 76 of the diaphragm 64 to engage the engagement surface 38 of the housing 22 at a junction of the second region 26 and the passageway 28. In so doing, contact between the diaphragm 64 and the engagement surface 38 proximate to the opening of the passageway 28 allows the diaphragm 64 to seal the passageway 28, thereby preventing fluid communication between the second region 26 and the first region 24 via the passageway 28. In addition, when the diaphragm 64 is moved from the relaxed state (FIG. 3) to the deflected state (FIG. 5), the diaphragm 64 may contact and compress the seal 70 in a direction substantially along the longitudinal axis 40 of the housing 22, thereby further sealing the passageway 28 and preventing fluid communication between the second region 26 and the firs region 24.

As described, the second region 26 is sealed from the passageway 28 and, thus, from the first region 24, due to engagement between the diaphragm 64 and the engagement surface 38 of the housing 22 proximate to the opening of the passageway 28 at the second region 26. Additionally, welding the perimeter 72 of the diaphragm 64 to the inner surface 74 of the housing 22 within the second region 26 likewise serves to prevent fluid communication between the second region 26 and the first region 24. Finally, the seal 70 may be disposed within the channel 36 to additionally ensure that the second region 26 is sealed from the first region 24.

The foregoing construction of the fluid-pressure indicator 10 allows the force (F) applied to the diaphragm 64 to be large without subjecting the components of the sensor assembly 12 disposed substantially within the first region 24 of the housing 22 to the high-pressure exerted on the diaphragm 64. In addition, allowing the diaphragm 64 to contact the engagement surface 38 of the housing 22 at the opening of the passageway 28 when the diaphragm 64 is in the deflected state prevents the diaphragm 64 from deflecting beyond a point where the diaphragm 64 may be damaged. In other words, when the force (F) applied to the diaphragm 64 by the fluid pressure disposed within the closed-loop system 16 deflects the diaphragm 64, the diaphragm 64 contacts the housing 22 at the engagement surface 38 and, therefore, transmits the force (F) into the body of the housing 22 and, thus, into the fitting 18 via engagement between the external threads 42 of the housing 22 and the threads 44 of the fitting 18. The force (F) of the high-pressure fluid disposed within the closed-loop system 16 may essentially be dissipated into the housing 22 and the fitting 18 without causing damage to the diaphragm 64 or to the components of the sensor assembly 12.

Figure 4:
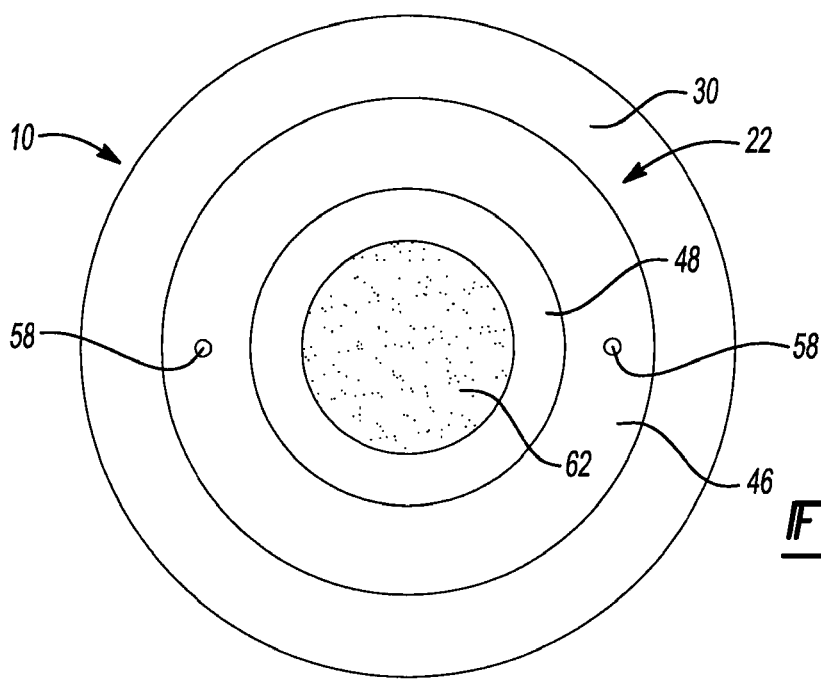
FIG. 4 is a top view of the fluid-pressure indicator of FIG. 3 showing an optically dense indicator fluid obscuring an indicator disk of the fluid-pressure indicator.

When the fluid pressure within the closed-loop system 16 is initially decreased, the diaphragm 64 remains in the deflected state and continually permits the indicator disk 52 to be viewed through the indicator bladder 50 and the sight glass 48. However, once the fluid pressure within the closed-loop system 16 falls below the threshold pressure, the biasing element 68 is permitted to apply a force on the transmission element 66 in the direction (Z), thereby causing the pin portion 78 and support 80 to move in the direction (Z) and move the diaphragm 64 into the relaxed state (FIG. 3). In so doing, the indicator fluid 62 disposed within the indicator bladder 50 is permitted to fill the space between the indicator disk 52 and the sight glass 48, thereby obscuring the indicator disk 52 from being viewed through the sight glass 48. For example, as shown in FIG. 4, when the fluid-pressure indicator 10 is viewed from the top and the diaphragm 64 is in the relaxed state (FIG. 3), the indicator fluid 62 disposed within the indicator bladder 50 prevents the indicator disk 52 from being viewed through the indicator bladder 50 and the sight glass 48. Once the indicator disk 52 is obscured from view through the indicator bladder 50 and the sight glass 48 (FIG. 4), the fluid-pressure indicator 10 provides an indication that the fluid pressure within the closed-loop system 16 has dropped below the threshold pressure.

As described, the fluid-pressure indicator 10 includes a diaphragm 64 that changes state from the relaxed state (FIG. 3) to the deflected state (FIG. 5) at a high pressure (i.e., at or above the threshold pressure of 200 psi) and remains in the deflected state until the pressure exerted on the diaphragm 64 falls below the threshold pressure (i.e., less than 200 psi). In addition, the diaphragm 64 may be welded to the housing 22 at the second region 26 and may be supported by the housing 22 when in the deflected state and, as such, may withstand a high-pressure fluid applied thereto at the second region 26. Furthermore, because the diaphragm 64 is sealed at the second region 26 and is supported by the housing 22 in the deflected state, the high-pressure fluid is prevented from passing from the second region 26 to the first region 24 via the passageway 28 and, therefore, the components of the sensor assembly 12 disposed within the first region 24 of the housing 22 are protected from the high-pressure fluid of the closed-loop system 16 during operation.

What is claimed is:

1. A fluid-pressure indicator comprising:
  a housing including a first region and a second region;
  a pressure-responsive member disposed in said first region and movable between an expanded state and a compressed state;
  an indicator disk viewable through said pressure-responsive member when said pressure-responsive member is in said compressed state and obscured from view through said pressure-responsive member when said pressure-responsive member is in said expanded state;
  a diaphragm movable from a relaxed state to a deflected state in response to pressure within said second region exceeding a threshold pressure, said diaphragm preventing fluid communication between said first region and said second region and causing said pressure-responsive member to move from said expanded state to said compressed state when said pressure exceeds said threshold pressure; and
  a transmission member at least partially disposed within said passageway, said transmission member operable to transmit a force from said diaphragm to said pressure-responsive member to move said pressure-responsive member from said expanded state to said compressed state when said diaphragm is moved from said relaxed state to said deflected state, wherein said housing includes an engagement surface that engages said diaphragm when said diaphragm is in said deflected state.

2. The fluid-pressure indicator of claim 1, wherein said diaphragm prevents fluid communication between said first region and said second region in each of said relaxed state and said deflected state.

3. The fluid-pressure indicator of claim 1, wherein a perimeter of said diaphragm is attached to said housing at said second region to prevent fluid communication between said first region and said second region.

4. The fluid-pressure indicator of claim 3, wherein said perimeter of said diaphragm is welded to said housing to prevent fluid communication between said first region and said second region.

5. The fluid-pressure indicator of claim 1, wherein said housing includes a passageway extending between said first region and said second region, said diaphragm contacting and sealing an opening to said passageway when in said deflected state to prevent fluid communication between said first region and said second region.

6. The fluid-pressure indicator of claim 1, further comprising a biasing member biasing said transmission member in a direction toward said diaphragm to maintain contact between said transmission member and said diaphragm when said diaphragm is in either of said relaxed state or said deflected state.

7. The fluid-pressure indicator of claim 1, further comprising a seal disposed within said second region and operable to engage said diaphragm to prevent fluid communication between said first region and said second region.

8. The fluid-pressure indicator of claim 7, wherein said seal is compressed in a direction extending along a longitudinal axis of said housing when said diaphragm moves from said relaxed state to said deflected state.

9. The fluid-pressure indicator of claim 1, wherein said threshold pressure is approximately between 100 psi and 200 psi.

10. The fluid-pressure indicator of claim 1, wherein said transmission member includes a pin portion and a support, said pin portion at least partially disposed within said passageway and having a first end fixedly attached to said support and a second end in contact with said diaphragm.

11. A fluid-pressure indicator comprising:
a housing including a first region, a second region, and a passageway extending between said first region and said second region;
a pressure-responsive member disposed in said first region and movable between an expanded state and a compressed state;
an indicator disk viewable through said pressure-responsive member when said pressure-responsive member is in said compressed state and obscured from view through said pressure-responsive member when said pressure-responsive member is in said expanded state;
a diaphragm movable from a relaxed state to a deflected state in response to pressure within said second region exceeding a threshold pressure to cause said pressure-responsive member to move from said expanded state to said compressed state, said diaphragm having a first side contacting an engagement surface of said housing at an opening of said passageway in said deflected state to prevent fluid communication between said first region and said second region; and
a transmission member at least partially disposed within said passageway, said transmission member operable to transmit a force from said diaphragm to said pressure-responsive member to move said pressure-responsive member from said expanded state to said compressed state when said diaphragm is moved from said relaxed state to said deflected state.

12. The fluid-pressure indicator of claim 11, wherein said diaphragm prevents fluid communication between said first region and said second region in each of said relaxed state and said deflected state.

13. The fluid-pressure indicator of claim 11, wherein a perimeter of said diaphragm is attached to said housing at said second region to prevent fluid communication between said first region and said second region.

14. The fluid-pressure indicator of claim 13, wherein said perimeter of said diaphragm is welded to said housing to prevent fluid communication between said first region and said second region.

15. The fluid-pressure indicator of claim 11, further comprising a biasing member biasing said transmission member in a direction toward said diaphragm to maintain contact between said transmission member and said diaphragm when said diaphragm is in either of said relaxed state or said deflected state.

16. The fluid-pressure indicator of claim 11, further comprising a seal disposed within said second region and operable to engage said diaphragm to prevent fluid communication between said first region and said second region.

17. The fluid-pressure indicator of claim 16, wherein said seal is compressed in a direction extending along a longitudinal axis of said housing when said diaphragm moves from said relaxed state to said deflected state.

18. The fluid-pressure indicator of claim 11, wherein said threshold pressure is approximately between 100 psi and 200 psi.

19. The fluid-pressure indicated of claim 11, wherein said transmission member includes a pin portion and a support, said pin portion at least partially disposed within said passageway and having a first end fixedly attached to said support and a second end in contact with said diaphragm.

* * * * *